United States Patent
Mochida et al.

(10) Patent No.: US 8,680,811 B2
(45) Date of Patent: Mar. 25, 2014

(54) ELECTRONIC DEVICE, CHARGER, AND ELECTRONIC DEVICE CHARGING SYSTEM

(75) Inventors: Norihito Mochida, Kanagawa (JP); Yasuji Nakamura, Kanagawa (JP); Masanori Oshimi, Kanagawa (JP); Hirohiko Yoshida, Kanagawa (JP); Akihiko Sekiguchi, Kanagawa (JP); Eiji Machii, Kanagawa (JP)

(73) Assignee: Panasonic Corporation, Osaka (JP)

( * ) Notice: Subject to any disclaimer, the term of this patent is extended or adjusted under 35 U.S.C. 154(b) by 318 days.

(21) Appl. No.: 12/935,431

(22) PCT Filed: Nov. 25, 2008

(86) PCT No.: PCT/JP2008/003457
§ 371 (c)(1), (2), (4) Date: Sep. 29, 2010

(87) PCT Pub. No.: WO2009/122470
PCT Pub. Date: Oct. 8, 2009

(65) Prior Publication Data
US 2011/0025264 A1    Feb. 3, 2011

(30) Foreign Application Priority Data

Mar. 31, 2008 (JP) ................. 2008-091246

(51) Int. Cl.
*H02J 7/00* (2006.01)
*H02J 7/04* (2006.01)

(52) U.S. Cl.
USPC ........... 320/108; 320/107; 320/114; 320/160; 320/134

(58) Field of Classification Search
USPC ......... 320/108, 114, 107, 111, 110, 113, 112, 320/115, 160, 135, 134, 127
See application file for complete search history.

(56) References Cited

U.S. PATENT DOCUMENTS 7,605,496 B2 * 10/2009 Stevens et al. .................. 307/17

(Continued)

FOREIGN PATENT DOCUMENTS

CN    1941545 A    4/2007
JP    2000-076399 A    3/2000

(Continued)

OTHER PUBLICATIONS

International Search Report for PCT/JP2008/003457 mailed Feb. 17, 2009, 3 pages.

(Continued)

*Primary Examiner* — Edward Tso
*Assistant Examiner* — Alexis Boateng
(74) *Attorney, Agent, or Firm* — Seed IP Law Group PLLC

(57) ABSTRACT

An object of the present invention is to provide an electronic device which is capable of conducting a proximity noncontact communication even if charging of a secondary battery is not fully completed and also whose secondary battery never falls into an overdischarge state during the proximity noncontact communication. An electronic device (2) employs a secondary battery (28), which is rechargeable by a charger (3) that gives a charge of electricity in a noncontact manner, as a power source, and is capable of conducting a proximity noncontact communication with the charger (3). The electronic device (2) repeats a charging process, in which this equipment charges the secondary battery (28) for a predetermined period (Tb1) by receiving a supply of an electric power from the charger (3) via a noncontact power-receiving secondary coil (22), and a communication process, in which this equipment conducts a data communication for a predetermined period (Ta1) when a voltage of the secondary battery (28) at a time of charging start is below a predetermined value (Va), and also repeats a charging process, in which this equipment charges the secondary battery (28) for a predetermined period (Tb2) by receiving a supply of the electric power from the charger (3) via the noncontact power-receiving secondary coil (22), and a communication process, in which this equipment conducts the data communication for a predetermined period (Ta2)(>Ta1) when the voltage of the secondary battery (28) at a time of charging start is more than a predetermined value (Va).

27 Claims, 9 Drawing Sheets

(56) References Cited

U.S. PATENT DOCUMENTS

| | | | |
|---|---|---|---|
| 8,204,531 B2* | 6/2012 | Jin et al. | 455/522 |
| 2004/0245348 A1 | 12/2004 | Nagaoka et al. | |
| 2007/0069687 A1* | 3/2007 | Suzuki | 320/108 |
| 2007/0139000 A1* | 6/2007 | Kozuma et al. | 320/108 |
| 2008/0062066 A1* | 3/2008 | Arai | 343/867 |
| 2008/0197711 A1* | 8/2008 | Kato et al. | 307/104 |
| 2009/0061768 A1 | 3/2009 | Simada | |
| 2009/0121675 A1* | 5/2009 | Ho et al. | 320/108 |
| 2010/0066305 A1* | 3/2010 | Takahashi et al. | 320/108 |

FOREIGN PATENT DOCUMENTS

| | | |
|---|---|---|
| JP | 2001-109547 A | 4/2001 |
| JP | 2003-259027 A | 9/2003 |
| JP | 2006-295469 A | 10/2006 |
| JP | 2008-065660 A | 3/2008 |

OTHER PUBLICATIONS

Chinese Office Action, dated Aug. 31, 2012, for corresponding Chinese Application No. 200880128469.6, 15 pages. (with English Translation).

* cited by examiner

ELECTRONIC DEVICE, CHARGER, AND ELECTRONIC DEVICE CHARGING SYSTEM

TECHNICAL FIELD

The present invention relates to an electronic device such as a cellular phone, or the like, a charger for charging the electronic device, and an electronic device charging system consisting of the electronic device and the charger.

BACKGROUND ART

In a mobile electronic device such as a cellular phone, or the like, normally a secondary battery that can be charged/discharged repeatedly with electricity is employed to secure a power source. Also, some of conventional electronic devices are designed to charge a secondary battery in a noncontact manner (see Patent Literature 1, for example).

In the electronic device that puts the secondary battery on charge in a noncontact manner, when a power receiving coil for noncontact charging and a loop antenna for proximity noncontact communication (Felica (registered trademark), or the like) are arranged in close vicinity to each other, it is probable that a malfunction is induced in the proximity noncontact communication due to an adverse influence of a harmonic noise generated in the power receiving coil.

Also, as the method of preventing the adverse influence of such harmonic noise, in Patent Literature 2, for example, the technology to shift a resonance frequency of one tuning circuit in two proximity noncontact communication antennas or more from resonance frequencies of the remaining tuning circuits respectively is disclosed.

Patent Literature 1: JP-A-2000-076399 (Japanese Patent No. 318086)
Patent Literature 2: JP-A-2006-295469

DISCLOSURE OF THE INVENTION

Problems that the Invention is to Solve

Meanwhile, in such a situation that the proximity noncontact communication should be conducted after the noncontact charging is continued until the charging of a secondary battery is completed, it is impossible to get into the proximity noncontact communication during the noncontact charging. For example, when video contents should be downloaded through the proximity noncontact communication, neither the video contents can be downloaded during the noncontact charging by using the proximity noncontact communication, nor the video contents can be viewed during the noncontact charging while downloading such video contents. Also, when the long-time communication (e.g., the downloading of the video contents) is conducted by using the proximity noncontact communication in a low battery-voltage state in which the secondary battery is set substantially closely to its overdischarge state, the secondary battery falls into an overdischarge state.

The present invention has been made in view of such circumstances, and it is an object of the present invention to provide an electronic device which is capable of conducting a proximity noncontact communication even if charging of a secondary battery is not fully completed and also whose secondary battery never falls into an overdischarge state during the proximity noncontact communication.

Means for Solving the Problems

An electronic device of the present invention that employs a secondary battery, which is rechargeable by a charger, as a power source and is capable of conducting a proximity noncontact communication with the charger, includes a power receiving coil for receiving an electric power from the charger by electromagnetic induction; an antenna used for the proximity noncontact communication; and a charging and communication controlling section for controlling a charging and the proximity noncontact communication; wherein the secondary battery is charged based on the received electric power, and the charging and communication controlling section controls to execute a first charging process of charging the secondary battery, then a first communicating process of conducting the proximity noncontact communication, then a second charging process of charging the secondary battery, and then a second communicating process of conducting the proximity noncontact communication.

According to this configuration, the electronic device executes the first charging process of charging the secondary battery, then the first communicating process of conducting the proximity noncontact communication, then the second charging process of charging the secondary battery, and then the second communicating process of conducting the proximity noncontact communication. Therefore, the proximity noncontact communication can be conducted even before the charging is fully completed, and also the long-time proximity noncontact communication such as the downloading of the video contents, or the like can be conducted during the noncontact charging. Also, the proximity noncontact communication is not conducted during the period in which the harmonic noise is produced from the power receiving coil (i.e., the period in which the secondary battery is charged). Therefore, the proximity noncontact communication is never affected by the noise.

An electronic device of the present invention that employs a secondary battery, which is rechargeable by a charger, as a power source and is capable of conducting a proximity noncontact communication with the charger, includes a power receiving coil for receiving an electric power from the charger by electromagnetic induction; an antenna used for the proximity noncontact communication; and a charging and communication controlling section for controlling a charging and the proximity noncontact communication; wherein the secondary battery is charged based on the received electric power, and the charging and communication controlling section controls to execute a first charging process of charging the secondary battery, then a first communicating process of conducting the proximity noncontact communication for a first variable time, then a second charging process of charging the secondary battery, and then a second communicating process of conducting the proximity noncontact communication for the first variable time, and wherein the first variable time is set to a first predetermined period when a voltage of the secondary battery is more than a predetermined value, and is set to a second predetermined period when the voltage of the secondary battery is below the predetermined value.

An electronic device of the present invention that employs a secondary battery, which is rechargeable by a charger, as a power source and is capable of conducting a proximity noncontact communication with the charger, includes a power receiving coil for receiving an electric power from the charger by electromagnetic induction; an antenna used for the proximity noncontact communication; and a charging and communication controlling section for controlling a charging and the proximity noncontact communication; wherein the secondary battery is charged based on the received electric power, and the charging and communication controlling section controls to execute a first charging process of charging the secondary battery for a first variable time, then a first communicating process of conducting the proximity noncontact communication for a second variable time, then a second charging process of charging the secondary battery for the first variable time, and then a second communicating process of conducting the proximity noncontact communication for the second variable time, and wherein the first variable time is set to a first predetermined period when a voltage of the secondary battery is more than a predetermined value, and is set to a second predetermined period that is shorter than the first predetermined period when the voltage of the secondary battery is below the predetermined value, and the second variable time is set to a third predetermined period when the voltage of the secondary battery is more than the predetermined value, and is set to a fourth predetermined period that is shorter than the third predetermined period when the voltage of the secondary battery is below the predetermined value.

The antenna and the power receiving coil may be arranged in a superposed state.

Also, the antenna may be composed of a loop antenna, and a center of the loop antenna may be set to coincide with a center of the power receiving coil.

Also, a part of conductor of the loop antenna and a part of conductor of the power receiving coil may be formed in common.

Also, the electronic device may further includes a changeover switch connected to the antenna, for switching electrical conduction and cutoff; wherein the charging and communication controlling section brings the changeover switch into a conduction state during the first communicating process and the second communicating process, and brings the changeover switch into a cutoff state during the first charging process and the second charging process.

A charger of the present invention that charges an electronic device using a secondary battery as a power source, and is capable of conducting a proximity noncontact communication with the electronic device, includes a power receiving coil for feeding an electric power to the electronic device by electromagnetic induction; an antenna used for the proximity noncontact communication; and a charging and communication controlling section for controlling a power transmission and the proximity noncontact communication; wherein a charge of electricity is given to the electronic device.

The antenna and the power transmitting coil may be arranged in a superposed state.

Also, the antenna may be composed of a loop antenna, and a center of the loop antenna may be set to coincide with a center of the power receiving coil.

Also, a part of conductor of the loop antenna and a part of conductor of the power transmitting coil may be formed in common.

The charger may further includes a changeover switch connected to the antenna, for switching electrical conduction and cutoff; wherein the charging and communication controlling section brings the changeover switch into a conduction state during the first communicating process and the second communicating process, and brings the changeover switch into a cutoff state during the first charging process and the second charging process.

An electronic device charging system of the present invention, includes the electronic device set forth in the above; and the charger set forth in the above.

Advantages of the Invention

According to the present invention, the electronic device which is capable of conducting the proximity noncontact communication even if the charging of the secondary battery is not fully completed and whose secondary battery never falls into the overdischarge state during the proximity noncontact communication can be provided.

Figure 1:
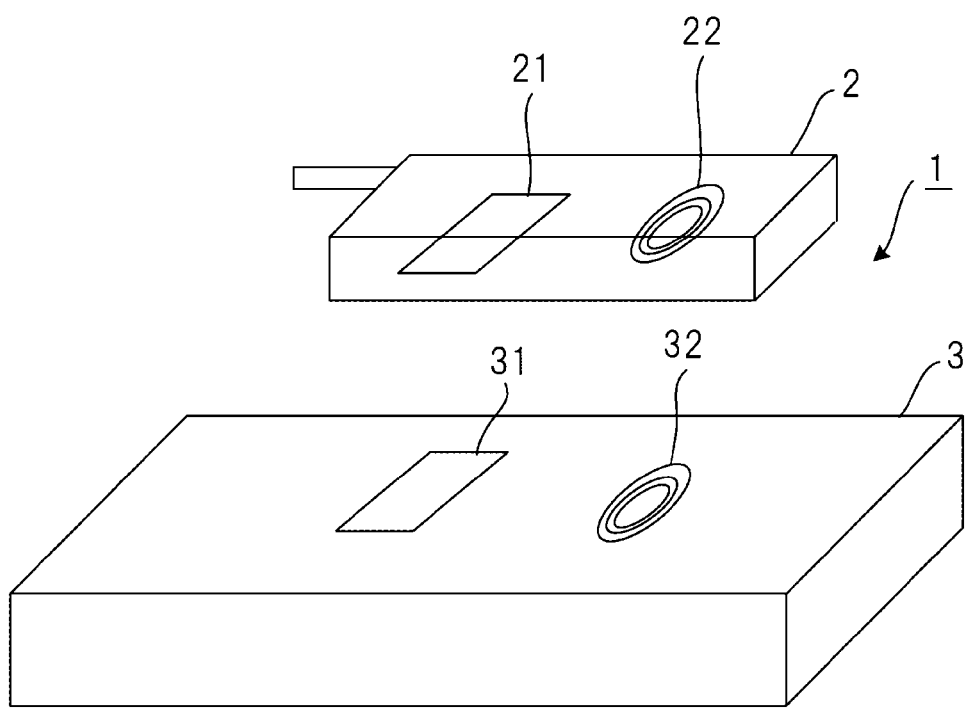
[FIG. 1] A perspective view showing an outline of an electronic device charging system according to Embodiment 1 of the present invention.

DESCRIPTION OF REFERENCE NUMERALS AND SIGNS 1, 1A electronic device charging system
2, 2A electronic device
3, 3A charger
21 proximity noncontact communication antenna
22 noncontact power-receiving secondary coil
23 proximity noncontact communication secondary controlling portion
24 input signal deciding portion
25 noncontact charging secondary controlling portion
26 battery charging controlling portion
27 remaining battery level detecting portion
28 secondary battery
29a, 29b, 35a, 35b changeover switch
30, 36 conflict controlling portion
31 proximity noncontact communication external unit antenna
32 noncontact feeding primary coil
33 controlling portion of a proximity noncontact communication external unit
34 noncontact charging primary controlling portion
37, 39 charging and communication controlling portion
38, 40 power-transmitting communication controlling portion

BEST MODE FOR CARRYING OUT THE INVENTION

Preferred embodiments for carrying out the present invention will be explained with reference to the drawings hereinafter.

Embodiment 1

FIG. 1 is a perspective view showing an outline of an electronic device charging system according to Embodiment 1 of the present invention. In FIG. 1, an electronic device charging system 1 of the present embodiment includes an electronic device 2 such as a cellular phone, PHS (Personal Handy-phone System), PDA (Personal Digital Assistant), or the like, and a charger 3 for charging the electronic device 2 with electricity in a noncontact manner. The electronic device 2 can charge a rechargeable battery (secondary battery) by receiving a power feeding from the charger 3 in a noncontact state with the charger 3. Here, the "noncontact state" signifies such a state that the electronic device 2 and the charger 3 can transfer an electric power (radio wave), signals, etc. mutually in a state that both equipments are not directly connected electrically via metal terminals.

In the electronic device 2, a proximity noncontact communication antenna 21 for conducting the proximity noncontact communication with the charger 3, and a noncontact power-receiving secondary coil 22 for receiving an electric power from the charger 3 by electromagnetic induction are provided on the same plane of an equipment main body. In the charger 3, a proximity noncontact communication external unit antenna 31 for conducting the proximity noncontact communication with the electronic device 2, and a noncontact feeding primary coil 32 for transmitting an electric power to the electronic device 2 by electromagnetic induction are provided on the same plane of a charger main body.

Figure 2:
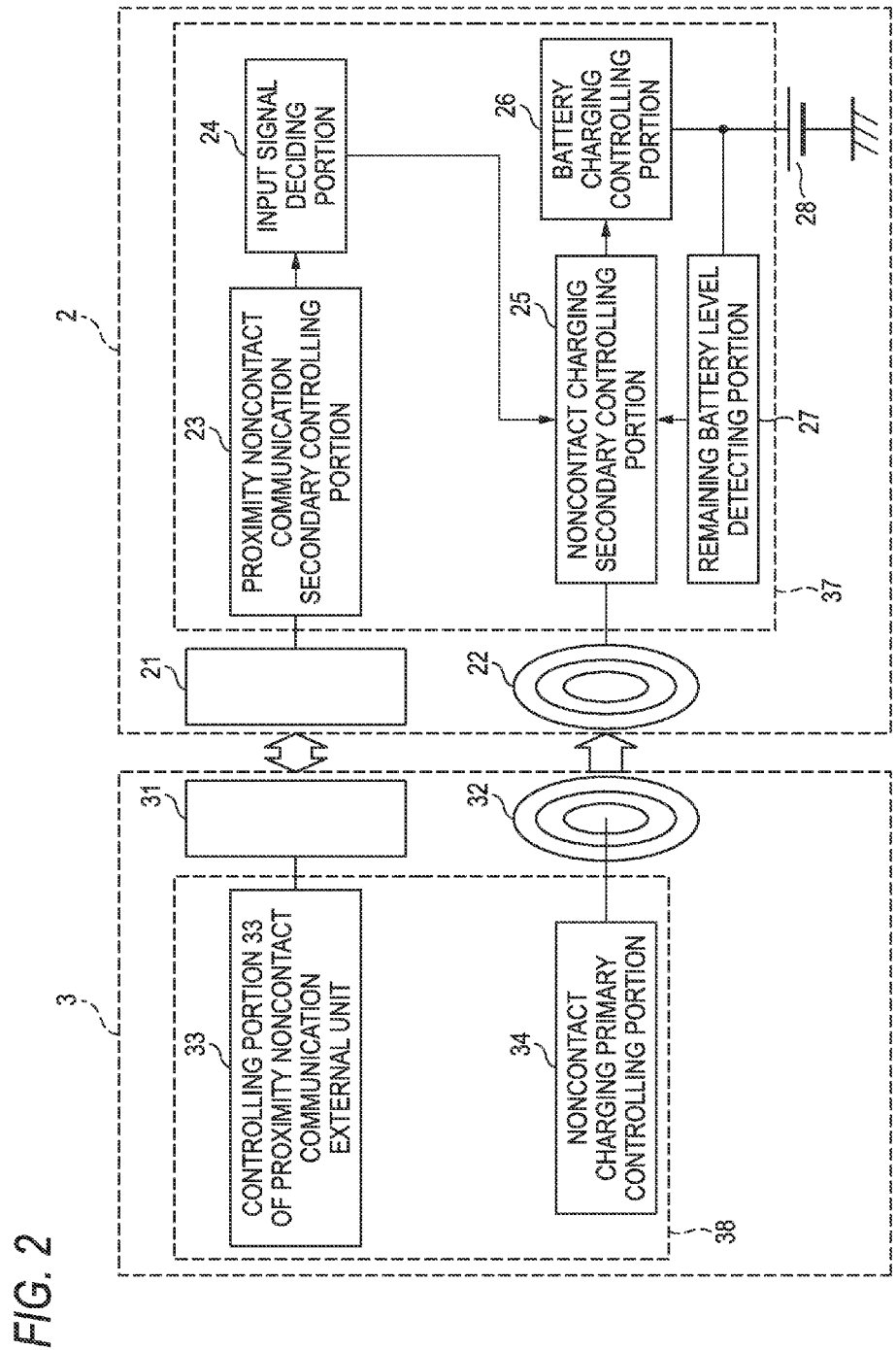
[FIG. 2] A block diagram showing a schematic configuration of an electronic device and a charger of the electronic device charging system in FIG. 1.

FIG. 2 is a block diagram showing a schematic configuration of the electronic device 2 and the charger 3 of the electronic device charging system 1 according to the present embodiment. In FIG. 2, the electronic device 2 includes the proximity noncontact communication antenna 21 and the noncontact power-receiving secondary coil 22 both described above, a proximity noncontact communication secondary controlling portion 23, an input signal deciding portion 24, a noncontact charging secondary controlling portion 25, a battery charging controlling portion 26, a remaining battery level detecting portion 27, and a rechargeable secondary battery 28 such as a lithium ion battery, or the like. The proximity noncontact communication antenna 21 is used to communicate with the proximity noncontact communication external unit antenna 31 of the charger 3. The noncontact power-receiving secondary coil 22 is coupled electromagnetically to the noncontact feeding primary coil 32 of the charger 3, and is used to receive a supply of an electric power. Also, the noncontact power-receiving secondary coil 22 is used to transmit ID information, charging completion signal, etc. to the charger 3 by utilizing a load modulation, or the like.

The proximity noncontact communication secondary controlling portion 23 receives a billing request signal transmitted from the charger 3 via the proximity noncontact communication antenna 21, performs a billing process in accordance with the received billing request signal, and transmits a billing process completion signal to the charger 3 via the proximity noncontact communication antenna 21 after the billing process. The input signal deciding portion 24 makes a decision of a communication transmission mode (billing) state in the proximity noncontact communication secondary controlling portion 23.

The noncontact charging secondary controlling portion 25 transmits ID information assigned to the electronic device 2 from the noncontact power-receiving secondary coil 22 to the charger 3 by utilizing a load modulation, or the like, and receives an electric power transmitted from the charger 3 via the noncontact power-receiving secondary coil 22. Also, the noncontact charging secondary controlling portion 25 transmits a charging completion signal notifying that the charging process is completed, to the charger 3 from the noncontact power-receiving secondary coil 22 to the charger 3 by utilizing the load modulation, or the like. Also, the noncontact charging secondary controlling portion 25 judges whether a remaining battery level detected by the remaining battery level detecting portion 27 is in excess of a predetermined voltage or is below the predetermined voltage. The remaining battery level detecting portion 27 detects a battery voltage of the secondary battery 28 as a remaining battery level. The battery charging controlling portion 26 controls start/stop of the charging of the secondary battery 28, based on a decision of the remaining battery level made by the noncontact charging secondary controlling portion 25. The battery charging controlling portion 26 performs the charging of the secondary battery 28 by using an electric power received by the noncontact power-receiving secondary coil 22.

Also, in the electronic device 2, the proximity noncontact communication secondary controlling portion 23, the input signal deciding portion 24, the noncontact charging secondary controlling portion 25, the battery charging controlling portion 26, and the remaining battery level detecting portion 27 constitute a charging and communication controlling portion 37 that controls the charging and the proximity noncontact communication. Also, in the charger 3, a controlling portion 33 of a proximity noncontact communication external unit and a noncontact charging primary controlling portion 34 constitute a power-transmitting communication controlling portion 38 that controls the power transmission and the proximity noncontact communication.

Figure 3:
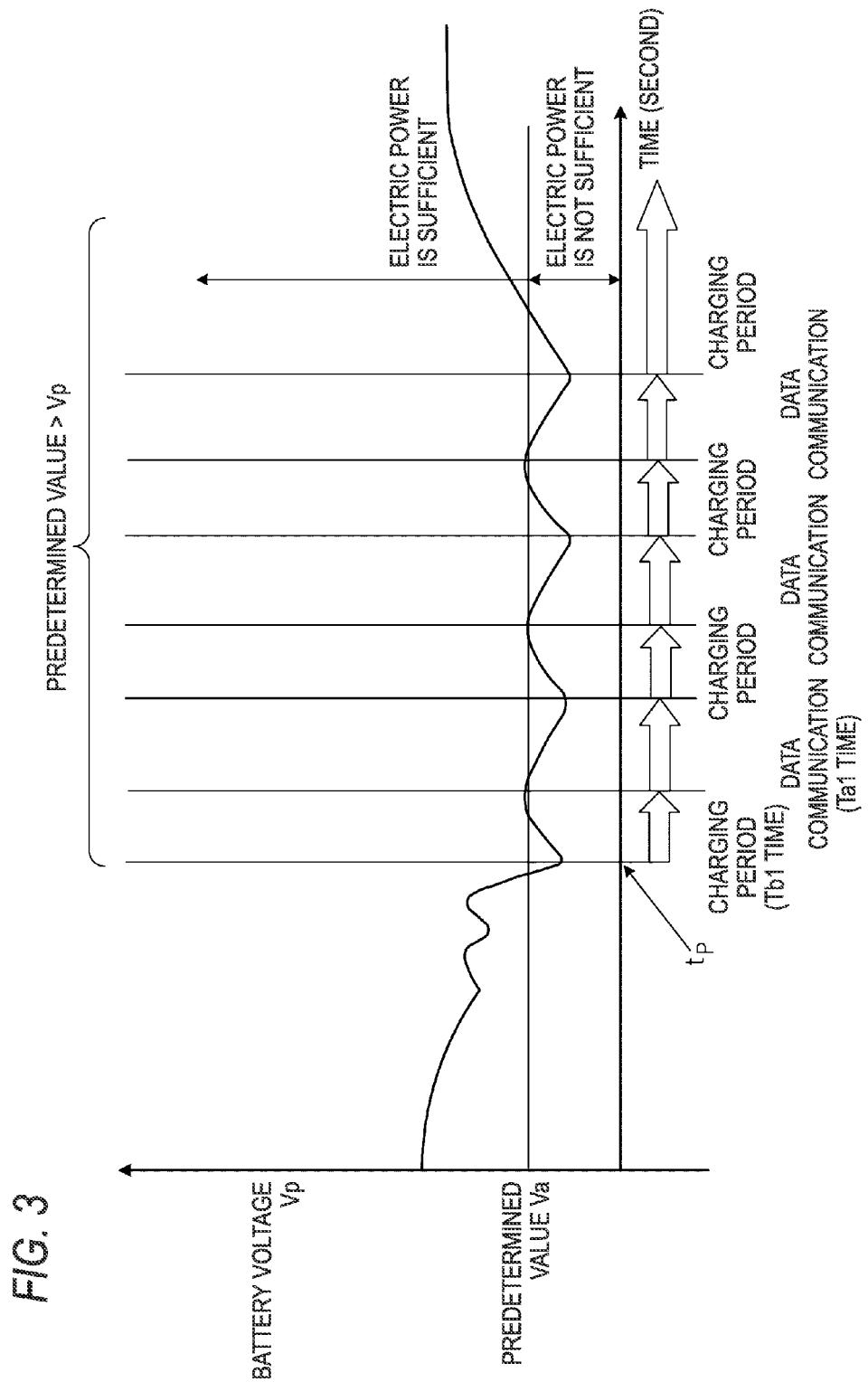
[FIG. 3] A view explaining a charging operation when a battery voltage Vp of a secondary battery is below a predetermined value Va in the electronic device of the electronic device charging system in FIG. 1.
Figure 4:
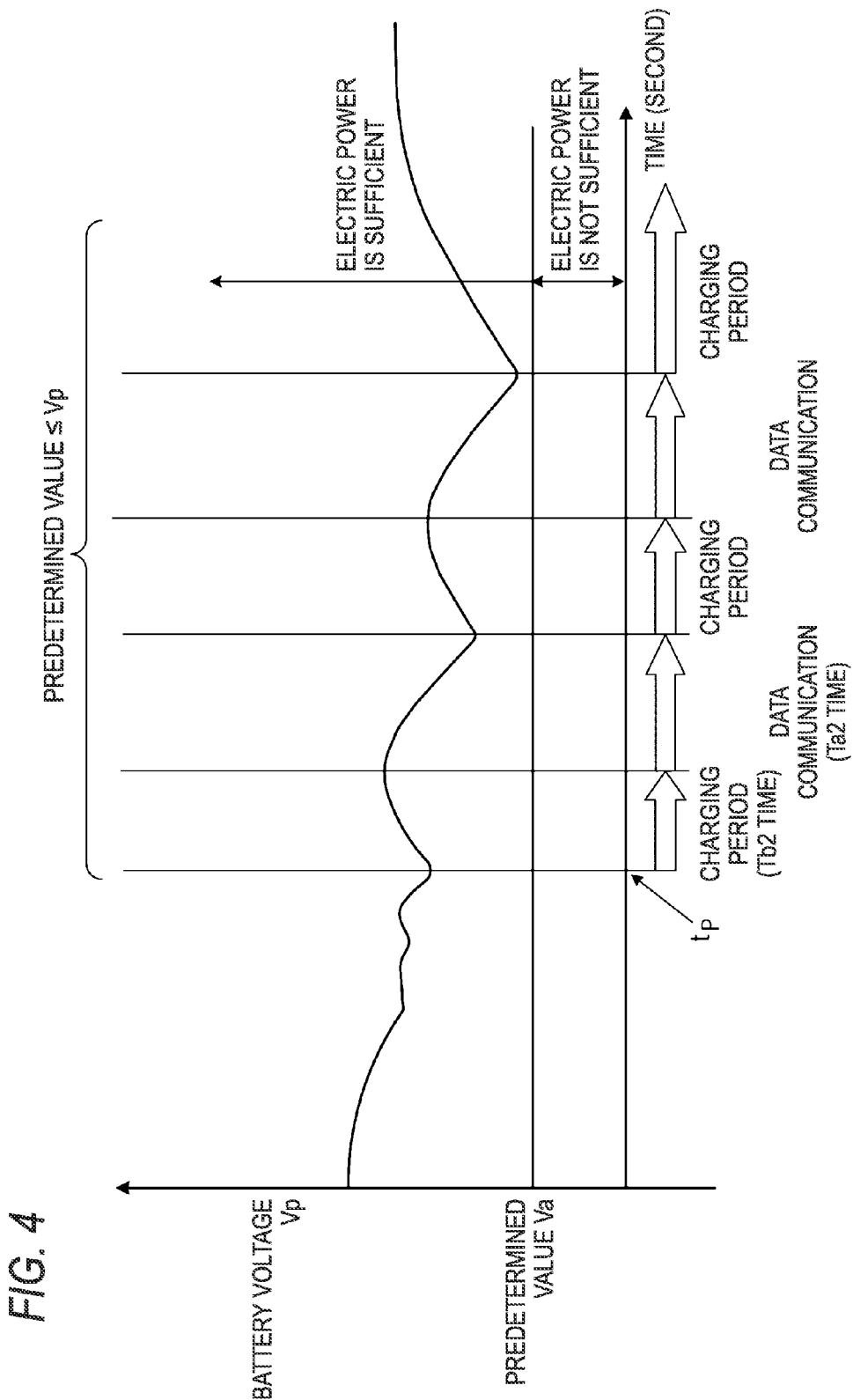
[FIG. 4] A view explaining a charging operation when a battery voltage Vp of a secondary battery is more than a predetermined value Va in the electronic device of the electronic device charging system in FIG. 1.

FIG. 3 and FIG. 4 are views showing a charging operation respectively when the electronic device 2 conducts the long-time communication (e.g., the downloading of the video contents) by using the proximity noncontact communication. FIG. 3 shows a charging operation when a battery voltage Vp of the secondary battery 28 at a time of charging start tp is below a predetermined value Va. FIG. 4 shows a charging operation when a battery voltage Vp of the secondary battery 28 at a time of charging start tp is more than a predetermined value Va. In FIG. 3 and FIG. 4, an ordinate denotes a battery voltage of the secondary battery 28, and an abscissa denotes a time (second). Here, a predetermined value Va corresponds to a low battery voltage that is substantially close to an overdischarge state, and is a voltage value that is not enough to operate the electronic device 2. Also, the charging is started at any timing when the user puts the electronic device 2 on the charger 3, the user applies the operation to the electronic device 2, or the like.

First, in FIG. 3, when a battery voltage Vp of the secondary battery 28 at a time of charging start tp is below a predetermined value Va, the electronic device 2 repeats a charging process in which the electronic device 2 charges the secondary battery 28 for a predetermined period Tb1 (second predetermined period) by receiving a supply of the electric power via the noncontact power-receiving secondary coil 22, and a communication process in which the electronic device 2 conducts the data communication for a predetermined period Ta1 (fourth predetermined period) after the charging process. That is, the electronic device 2 repeats the charging only for a charging period Tb1 (first charging process)→the data communication only for a data communication period Ta1 (first communication process)→the charging only for a charging period Tb1 (second charging process)→the data communication only for a data communication period Ta1 (second communication process) . . . .

Then, in FIG. 4, when a battery voltage Vp of the secondary battery 28 at a time of charging start tp is more than a predetermined value Va, the electronic device 2 repeats a charging process in which the electronic device 2 charges the secondary battery 28 for a predetermined period Tb2 (first predetermined period) by receiving a supply of the electric power via the noncontact power-receiving secondary coil 22, and a communication process in which the electronic device 2 conducts the data communication for a predetermined period Ta2 (third predetermined period) after the charging process. That is, the electronic device 2 repeats the charging only for a charging period Tb2 (first charging process)→the data communication only for a data communication period Ta2 (first communication process)→the charging only for a charging period Tb2 (second charging process)→the data communication only for a data communication period Ta2 (second communication process) . . . .

In the present embodiment, Ta2 (third predetermined period)>Ta1 (fourth predetermined period) and Tb2 (first predetermined period)>Tb1 (second predetermined period) are given. Here, Ta1 and Ta2 are a time period that is sufficiently shorter than a time required until the secondary battery 28 is fully charged, respectively, and are set to 1 second to 10 second, for example, and about 60 second is available at a maximum. Also, the reason why Ta1 is set shorter than Ta2 is that a battery voltage Vp of the secondary battery 28 is lower than the voltage obtained in the case of Ta2. In this case, it is a matter of course that, when the electronic device 2 is removed from the charger 3 during the charging period, the charging is suspended.

In this manner, in such a situation that the electronic device 2 can employ the secondary battery 28, which is rechargeable by the charger 3 that gives a charge of electricity in a noncontact system, as a power source and also can conduct the proximity noncontact communication with the charger 3, when a voltage of the secondary battery 28 is below a predetermined value Va, the electronic device 2 repeats the charging process in which the electronic device 2 charges the secondary battery 28 for a predetermined period Tb1 by receiving a supply of the electric power from the charger 3 via the noncontact power-receiving secondary coil 22, and the communication process in which the electronic device 2 conducts the data communication for a predetermined period Ta1. Also, when a voltage of the secondary battery 28 is in excess of a predetermined value Va, the electronic device 2 repeats the charging process in which the electronic device 2 charges the secondary battery 28 for a predetermined period Tb2 by receiving a supply of the electric power from the charger 3 via the noncontact power-receiving secondary coil 22, and the communication process in which the electronic device 2 conducts the data communication for a predetermined period Ta2 (>Ta1).

Returning to FIG. 2, the charger 3 includes the proximity noncontact communication external unit antenna 31 and the noncontact feeding primary coil 32 both described above, the controlling portion 33 of the proximity noncontact communication external unit, and the noncontact charging primary controlling portion 34. The controlling portion 33 of the proximity noncontact communication external unit transmits the data such as the video contents, etc. and various signals to the electronic device 2. When the data such as the video contents, etc., which contains a great deal of data, should be transmitted at a time of charging of the electronic device 2, such data transmission and the power transmission are executed in a time-division system. The noncontact charging primary controlling portion 34 controls the supply and stop of the electric power for the electronic device 2 side. When the data such as the video contents, etc., which contains a great deal of data, should be transmitted at a time of supplying an electric power to the electronic device 2 (i.e., at a time of charging of the electronic device 2), such data transmission and the power transmission are executed in a time-division system. Also, the noncontact charging primary controlling portion 34 detects the presence or absence of the load, in response to whether or not an electric current flows through the noncontact feeding primary coil 32. In this case, when the magnetic material that is electromagnetically coupled to the noncontact feeding primary coil 32 is located in vicinity of the noncontact feeding primary coil 32, the noncontact charging primary controlling portion 34 detects the load based on the fact that an electric current flows through the noncontact feeding primary coil 32.

Also, the noncontact charging primary controlling portion 34 detects a foreign object in response to a value of the electric current flowing through the noncontact feeding primary coil 32. In this case, a value of the electric current flowing through the noncontact feeding primary coil 32 is different between the noncontact power-receiving secondary coil 22 of the electronic device 2 and other body (e.g., ten yen coin). Therefore, if a value of the electric current flowing through the noncontact feeding primary coil 32 is stored when the noncontact power-receiving secondary coil 22 is located closely, the noncontact charging primary controlling portion 34 can decide a difference between the electronic device 2 and other body by comparing the detected value with this stored value. In this event, if a value of the electric current flowing through the noncontact feeding primary coil 32 is also stored when other body (e.g., ten yen coin, or the like) other than the noncontact power-receiving secondary coil 22 is put on the noncontact feeding primary coil 32, the noncontact charging primary controlling portion 34 can decide the concerned body.

Also, the noncontact charging primary controlling portion 34 conducts an ID authentication, based on the signal that is received by the noncontact feeding primary coil 32. In this case, the ID information is transmitted from the electronic device 2 by setting the electronic device 2 on the charger 3. Therefore, the noncontact charging primary controlling portion 34 acquires this ID information and conducts the ID authentication. Also, the noncontact charging primary controlling portion 34 counts a time required for transmitting an electric power to the electronic device 2.

In this manner, the charger 3 can charge the electronic device 2, in which the secondary battery 28 is used as a power source, in a noncontact system, and can conduct the proximity noncontact communication with the electronic device 2. Also, when the charger 3 detects the electronic device 2 in a standby mode, it transmits the electric power to the electronic device 2. Then, when the charger 3 receives a predetermined period completing signal indicating the effect that the transmission of electric power should be stopped, from the electronic device 2, it stops the transmission of the electric power. Immediately after this stop, the charger 3 conducts the proximity noncontact communication with the electronic device 2 so as to download the video contents, etc.

Figure 5:
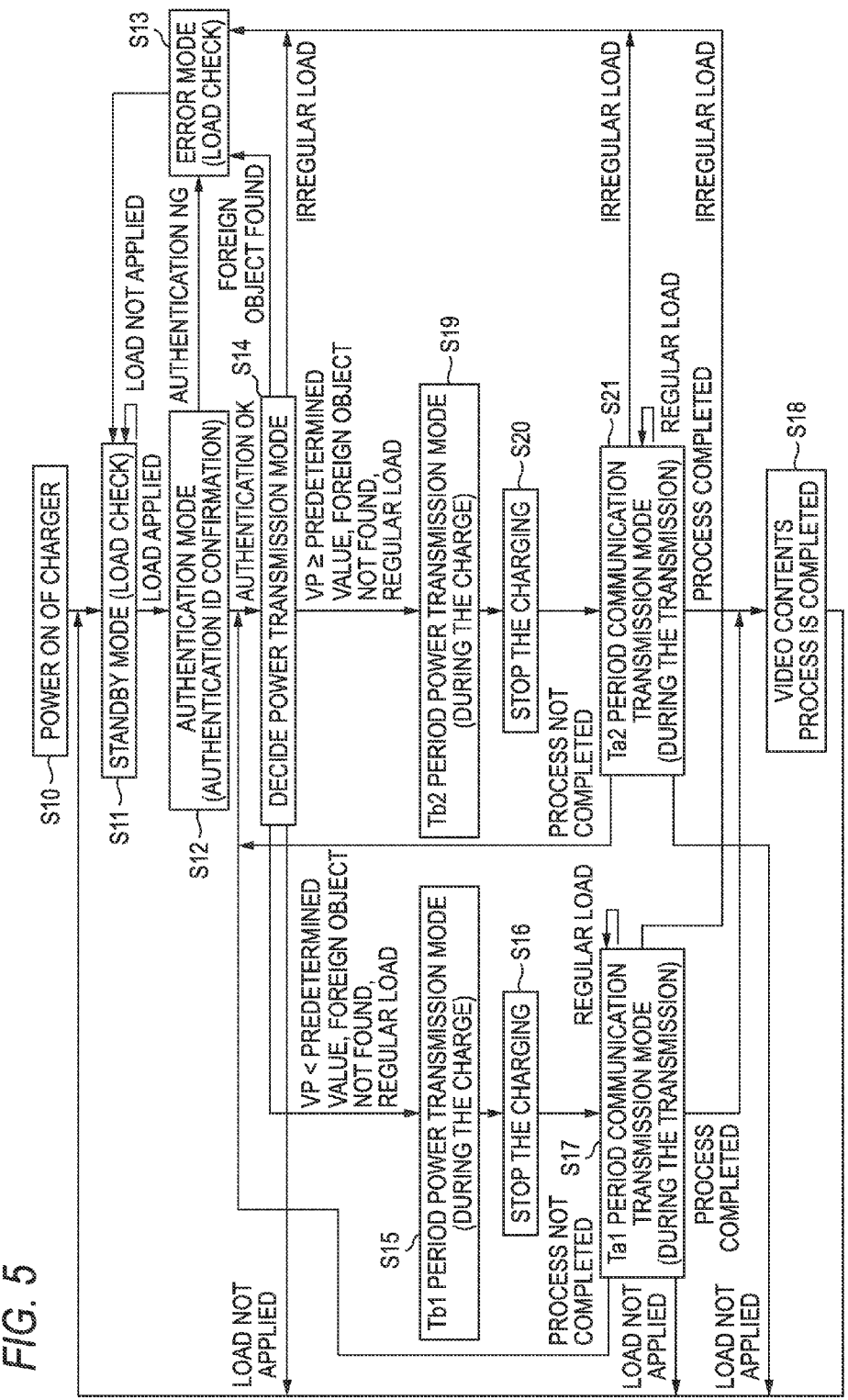
[FIG. 5] A flowchart showing an operation of the charger of the electronic device charging system in FIG. 1.

Next, respective operations of the electronic device 2 and the charger 3 in the electronic device charging system 1 according to the present embodiment will be explained here-under. FIG. 5 is a flowchart showing an operation of the charger 3. In FIG. 5, the charger 3 is started by turning ON a power source of the charger 3 (step S10). After the start, the charger 3 goes to a standby mode to check the load (step S11). That is, when the charger 3 goes to a standby mode, this charger 3 checks a current value of the noncontact feeding primary coil 32 to judge whether or not the load is present. If it is judged by this check that the load is present, the charger 3 goes to an authentication mode to confirm an authentication ID (step S12). If it is judged that the authentication ID cannot be confirmed, the charger 3 judges an authentication error because the regular load is not applied. Then, the charger 3 goes to an error mode. Then, the charger 3 checks the load in this error mode (step S13), and then the charger 3 goes back to step S11. In step S12, if it is judged that the authentication ID can be confirmed, the charger 3 makes a decision of a power transmission mode because the authentication ID is OK (step S14).

In the decision of a power transmission mode, if it is judged that the foreign object is present and the irregular load (the load whose ID cannot be confirmed) is applied, the charger 3 goes back to step S13. Also, if it is judged that the foreign object is not present but the regular load is applied in a condition that a battery voltage Vp of the secondary battery 28 is below a predetermined value Va, the charger 3 goes to a Tb1 period power transmission mode. Also, if it is judged that the foreign object is not present but the regular load is applied in a condition that a battery voltage Vp of the secondary battery 28 is in excess of a predetermined value Va, the charger 3 goes to a Tb2 period power transmission mode.

The charger 3 transmits an electric power to the electronic device 2 in the Tb1 period power transmission mode (step S15). Then, the charger 3 stops the transmission of the electric power when this charger receives a predetermined time expired signal from the electronic device 2 (step S16). That is, the charging operation is stopped. Then, the charger 3 goes to a Ta1 period communication transmission mode, and then transmits the video contents to the electronic device 2 (step S17). If the process of transmitting the video contents is not completed (i.e., the transmission of all data to be downloaded is not completed yet), the charger 3 goes back to step S14. Then, the decision of a power transmission mode is made, and then the transmission of the electric power and the transmission of the video contents are executed once again. The processes in step S15 to step S17 are repeated until the communication between the electronic device 2 and the charger 3 is terminated.

While the charger 3 is communicating with the electronic device 2, such charger 3 judges whether or not the load is present and whether or not the regular load (the load whose ID can be confirmed) is applied. If the load is not present (i.e., the electronic device 2 is removed from the charger 3), the charger 3 judges that the load is not present, and then the charger 3 goes back to step S11. Also, if the regular load is applied, the charger 3 still continues the transmission. Also, if the irregular load is applied, the charger 3 goes back to step S13. If the process of transmitting the video contents is completed (i.e., the transmission of all data to be downloaded is completed), the video contents process is completed (step S18).

In contrast, in the decision in step S14, if it is judged that the foreign object is not present but the regular load is applied in a condition that a battery voltage Vp of the secondary battery 28 is in excess of a predetermined value Va, the charger 3 goes to the Tb2 period power transmission mode. In this Tb2 period power transmission mode, the charger 3 transmits an electric power to the electronic device 2 (step S19). Then, the charger 3 stops the transmission of the electric power when this charger receives a predetermined time expired signal from the electronic device 2 (step S20). That is, the charging operation is stopped. Then, the charger 3 goes to a Ta2 period communication transmission mode, and transmits the video contents to the electronic device 2 (step S21). Then, if the process of transmitting the video contents is not completed (i.e., the transmission of all data to be downloaded is not completed yet), the charger goes back to step S14. Then, the decision of a power transmission mode is made, and then the transmission of the electric power and the transmission of the video contents are executed once again. The processes in step S19 to step S21 are repeated until the communication between the electronic device 2 and the charger 3 is terminated.

While the charger 3 is communicating with the electronic device 2, such charger 3 judges whether or not the load is present and whether or not the regular load is applied. If the load is not present (i.e., the electronic device 2 is removed from the charger 3), the charger 3 judges that the load is not present, and then the charger 3 goes back to step S11. Also, if the regular load is applied, the charger 3 still continues the transmission. Also, if the irregular load is applied, the charger 3 goes back to step S13. If the process of transmitting the video contents is completed (i.e., the transmission of all data to be downloaded is completed), the video contents process is completed (step S18).

In this manner, the charger 3 checks whether or not the load is present over the noncontact feeding primary coil 32. Then, if the load is present, the charger 3 confirms the authentication ID. Then, if the authentication ID can be confirmed, the charger 3 judges that the regular load is applied. The charger 3 executes the electric power feeding for the charging and the transmission of the video contents to the electronic device 2, which judges that the regular load is applied, repeatedly in a time-division system.

Figure 6:
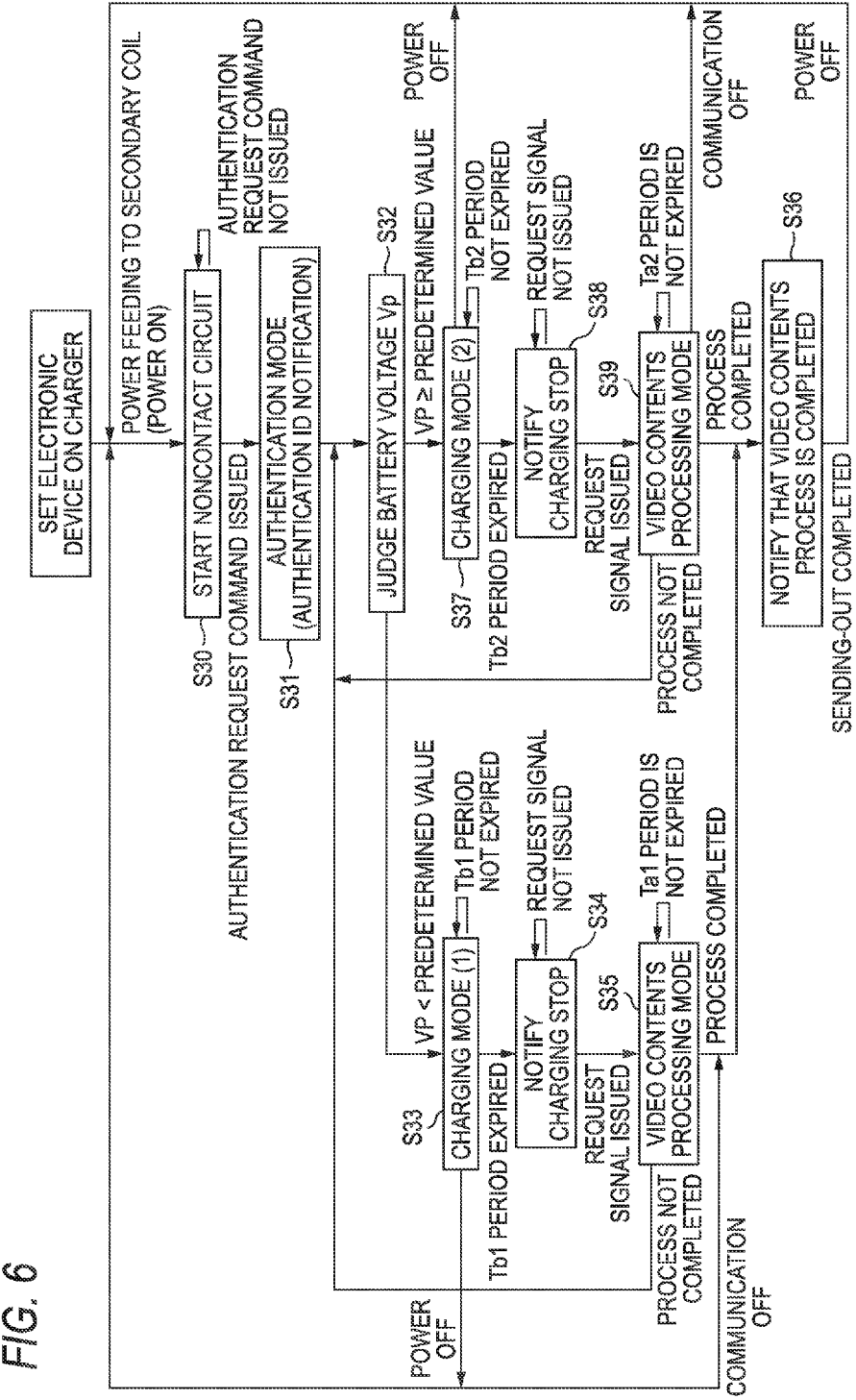
[FIG. 6] A flowchart showing an operation of the electronic device of the electronic device charging system in FIG. 1.

Next, FIG. 6 is a flowchart showing an operation of the electronic device 2. In FIG. 6, when the electronic device 2 is set on the charger 3 and the electric power is fed from the charger 3, the noncontact circuits (the proximity noncontact communication secondary controlling portion 23, the input signal deciding portion 24, the noncontact charging secondary controlling portion 25, the battery charging controlling portion 26, and the remaining battery level detecting portion 27) are started in response to this power feeding (step S30). Then, the electronic device 2 judges whether or not an authentication request command is issued from the charger 3. If the authentication request command is not issued, the electronic device 2 repeats this deciding operation until the authentication request command is issued. If the authentication request command is issued, the electronic device 2 goes to an authentication mode and notifies the charger 3 of the authentication ID (step S31).

After the electronic device 2 notified the charger 3 of the authentication ID, this electronic device 2 judges a battery voltage Vp of the secondary battery 28 (step S32). Then the electronic device 2 goes to a charging mode (1) if the battery voltage Vp is below a predetermined value Va, whereas the electronic device 2 goes to a charging mode (2) if the battery voltage Vp is in excess of a predetermined value Va. In the charging mode (1), the electronic device 2 judges whether or not the charging is applied to the secondary battery 28 in a Tb1 period (step S33). If a Tb1 period is not expired, the electronic device 2 repeats this process until this period is expired. Also, in the charging mode (1), the electronic device 2 judges whether or not a power source is turned OFF. If the power source is turned OFF, the electronic device 2 goes back to step S30. Then, if the charging applied to the secondary battery 28 in a Tb1 period is completed, the electronic device 2 sends a charging stop notification to the charger 3 (step S34). In this charging stop notification, the electronic device 2 judges whether or not a request signal indicating whether the downloading of the video contents is requested or not is issued from the charger 3. If this request signal is not issued, the electronic device 2 repeats this deciding operation. If this request signal is issued, the electronic device 2 goes to a video contents processing mode. In this video contents processing mode, the electronic device 2 downloads the data of the video contents in a Ta1 period (step S35). Also, in this video contents processing mode, if the data that is downloaded this time does not correspond to the last one, the electronic device 2 goes back to step S32. Also, if the communication is cut off, the electronic device 2 goes back to step S30. In contrast to the above, if the data that is downloaded this time corresponds to the last data, the electronic device 2 issues a video contents process completed notification to the charger 3 (step S36). In the video contents process completed notification, if the sending-out of the video contents data is completed, i.e., if the reception of all data is terminated, the electronic device 2 turns OFF the power source.

In contrast, in the decision in step S32, if a battery voltage Vp is in excess of a predetermined value Va, the electronic device 2 goes to the charging mode (2). In the charging mode (2), the electronic device 2 judges whether or not the charging is applied to the secondary battery 28 in a Tb2 period (step S37). If the Tb2 period is not expired, this process is repeated until this period is expired. Also, in the charging mode (2), the electronic device 2 judges whether or not the power source is turned OFF. If the power source is turned OFF, the electronic device 2 goes back to step S30. Then, if the charging applied to the secondary battery 28 in the Tb2 period is completed, the electronic device 2 sends a charging stop notification to the charger 3 (step S38). In this charging stop notification, the electronic device 2 judges whether or not the request signal indicating whether the downloading of the video contents is requested or not is issued from the charger 3. If this request signal is not issued, the electronic device 2 repeats this decision. If this request signal is issued, the electronic device 2 goes to a video contents processing mode. In the video contents processing mode, the data of the video contents is downloaded in the Ta2 period (step S39). Also, in the video contents processing mode, if the data that is downloaded this time does not correspond to the last one, the electronic device 2 goes back to step S32. Also, if the communication is cut off, the electronic device 2 goes back to step S30. In contrast to the above, if the data that is downloaded this time corresponds to the last data, the electronic device 2 sends the video contents process completed notification to the charger 3 (step S36).

Figure 7:
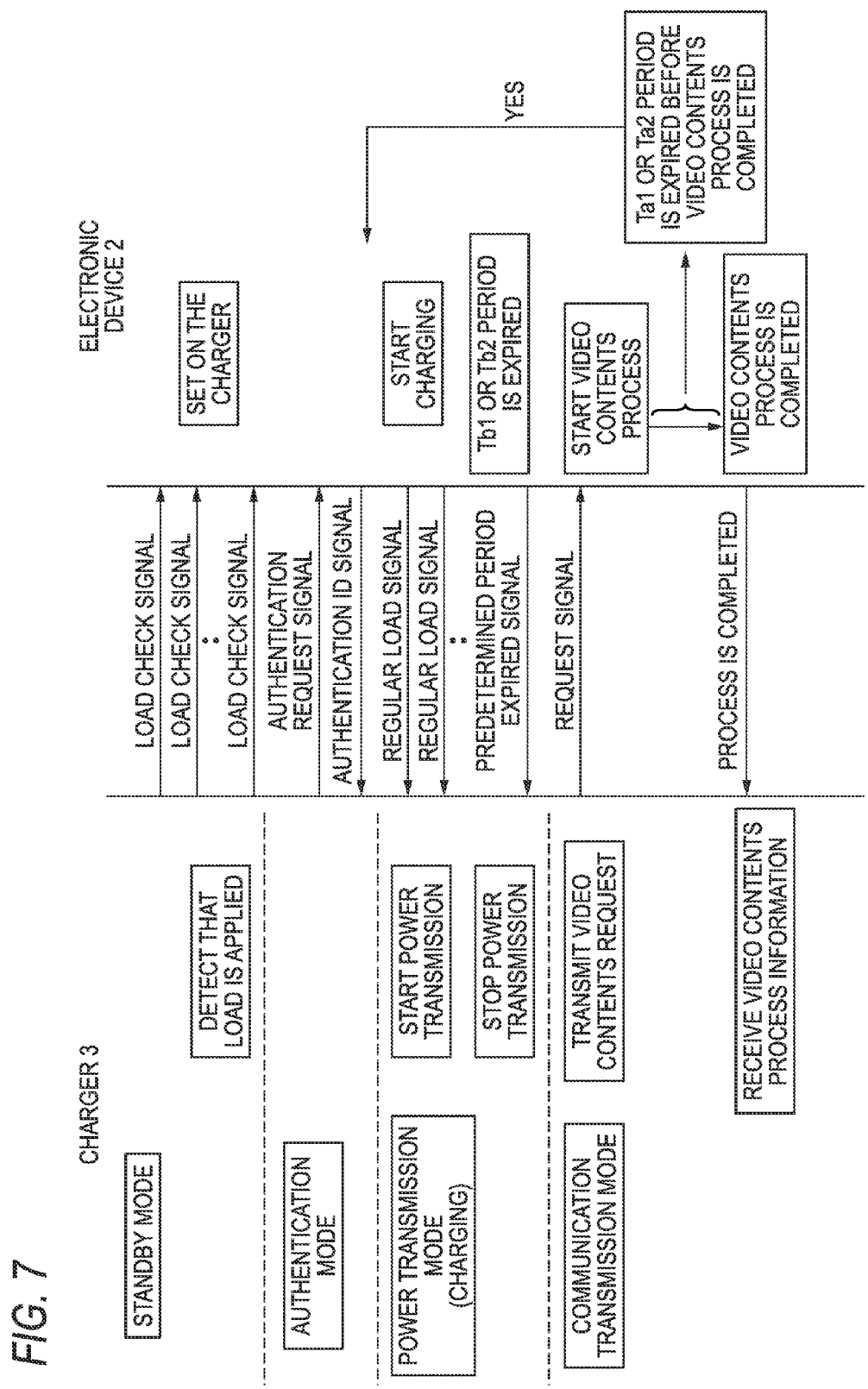
[FIG. 7] A sequence diagram showing operations between the electronic device and the charger of the electronic device charging system in FIG. 1.

FIG. 7 is a sequence diagram showing signal transmission/reception between the electronic device 2 and the charger 3. As shown in FIG. 7, the charger 3 goes to a standby mode at first, and sends out periodically a load check signal to detect whether or not the load is applied. Then, when the charger 3 detects the load, such charger 3 goes to an authentication mode and sends out an authentication request signal to authenticate the load. When an authentication ID signal is transmitted from the load in response to the authentication request signal, the charger 3 executes the authentication process based on this authentication ID signal. If the authentication is OK, the charger 3 goes to a power transmission mode (charging), and starts the transmission of the electric power. The electronic device 2 acting as the load receives the power feeding from the charger 3, and executes the charging in a Tb1 or Tb2 period. When the charging applied for the Tb1 or Tb2 period is completed, the electronic device 2 transmits a predetermined period expired signal to the charger 3. The charger 3 goes to a communication transmission mode when this charger receives the predetermined period expired signal, and then transmits a request signal to the electronic device 2. The electronic device 2 starts a video contents process. Then, the electronic device 2 starts the new charging every time when the charging applied for one Ta1 or Ta2 period is completed before the video contents process is completed. When the video contents process is completed, the electronic device 2 notifies the charger 3 of the process completion. The charger 3 receives the video contents process information.

As described above, the electronic device charging system 1 of the present embodiment employs the secondary battery 28, which is rechargeable by the charger 3 that gives a charge of electricity in a noncontact system, as the power source, and includes the electronic device 2 that can conduct the proximity noncontact communication with the charger 3. Also, this electronic device 2 repeats the charging process in which this electronic device 2 receives a supply of the electric power from the charger 3 via the noncontact power-receiving secondary coil 22 to charge the secondary battery 28, and the communicating process in which this electronic device 2 conducts the data communication through the proximity noncontact communication. As a result, the electronic device can conduct the proximity noncontact communication even if the charging of the secondary battery is not fully completed, and the long-time proximity noncontact communication such as the downloading of the video contents, or the like can be handled during the noncontact charging. Also, the user can view the video contents during the noncontact charging while downloading such video contents.

Also, when the voltage of the secondary battery 28 at a time of charging start is below a predetermined value Va, the electronic device 2 repeats the charging process in which this electronic device charges the secondary battery 28 for a predetermined period Tb1 by receiving a supply of the electric power from the charger 3 via the noncontact power-receiving secondary coil 22, and the communication process in which this electronic device conducts the data communication for a predetermined period Ta1. Also, when the voltage of the secondary battery 28 at a time of charging start is more than a predetermined value Va, the electronic device 2 repeats the charging process in which this electronic device charges the secondary battery 28 for a predetermined period Tb2 (>Tb1) by receiving a supply of the electric power from the charger 3 via the noncontact power-receiving secondary coil 22, and the communication process in which this electronic device conducts the data communication for a predetermined period Ta2 (>Ta1). Therefore, when the battery voltage Vp of the secondary battery 28 is below a predetermined value Va, the proximity noncontact communication is conducted in a time that is shorter than a time in which the communication is conducted when the battery voltage Vp of the secondary battery 28 is more than a predetermined value Va. As a result, such a situation can be prevented that the secondary battery falls into the overdischarge state during the proximity noncontact communication. Further, when the battery voltage Vp of the secondary battery 28 is more than a predetermined value Va, the noncontact charging is applied in a time that is longer than a time in which the noncontact charging is applied when the battery voltage Vp of the secondary battery 28 is more than a predetermined value Va. Therefore, when the battery voltage Vp is more than a predetermined value Va, not only the number of times the start and stop of the noncontact charging are repeated per unit time can be reduced, but also the number of times the communications are conducted between the electronic device 2 and the charger 3 per unit time to start and end the noncontact charging can be reduced. Thus, a time required for these communications can be shortened, so that a time applicable to the proximity noncontact communication can be extended relatively. As a result, the video contents, or the like can be downloaded quickly.

In addition, the proximity noncontact communication is not conducted during a period in which the harmonic noise is produced from the noncontact power-receiving secondary coil 22 (a period in which the secondary battery is charged). Therefore, the proximity noncontact communication is never affected by the noise.

Embodiment 2

Figure 8:
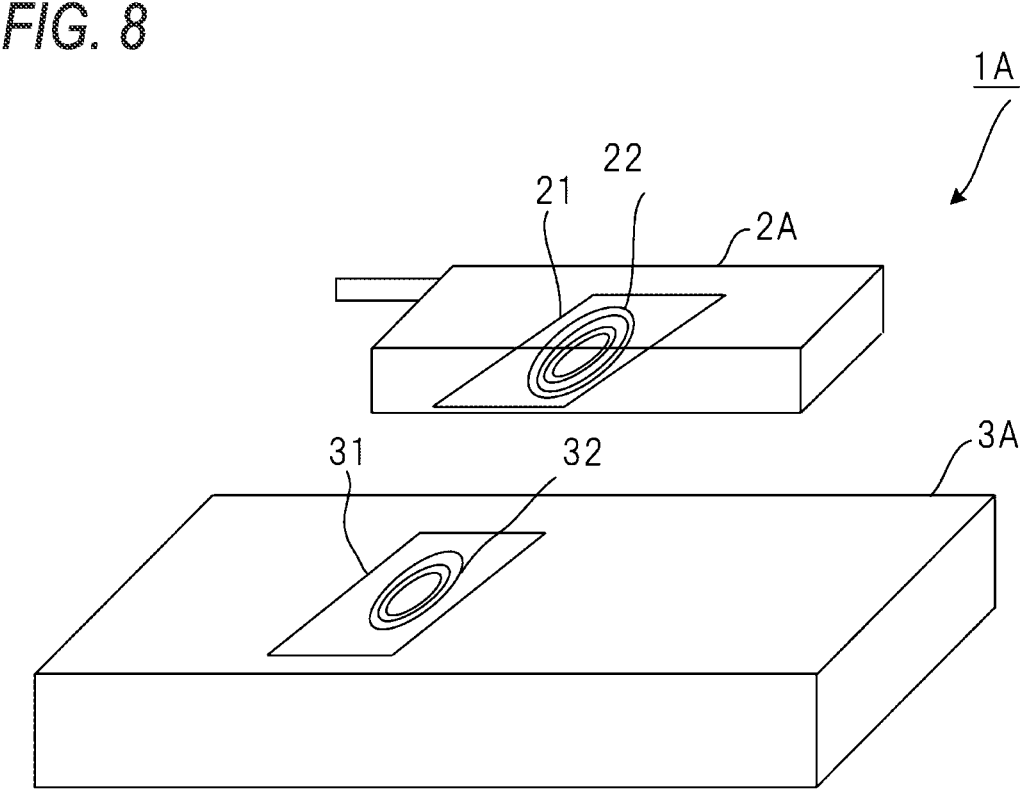
[FIG. 8] A perspective view showing an outline of an electronic device charging system according to Embodiment 2 of the present invention.
Figure 9:
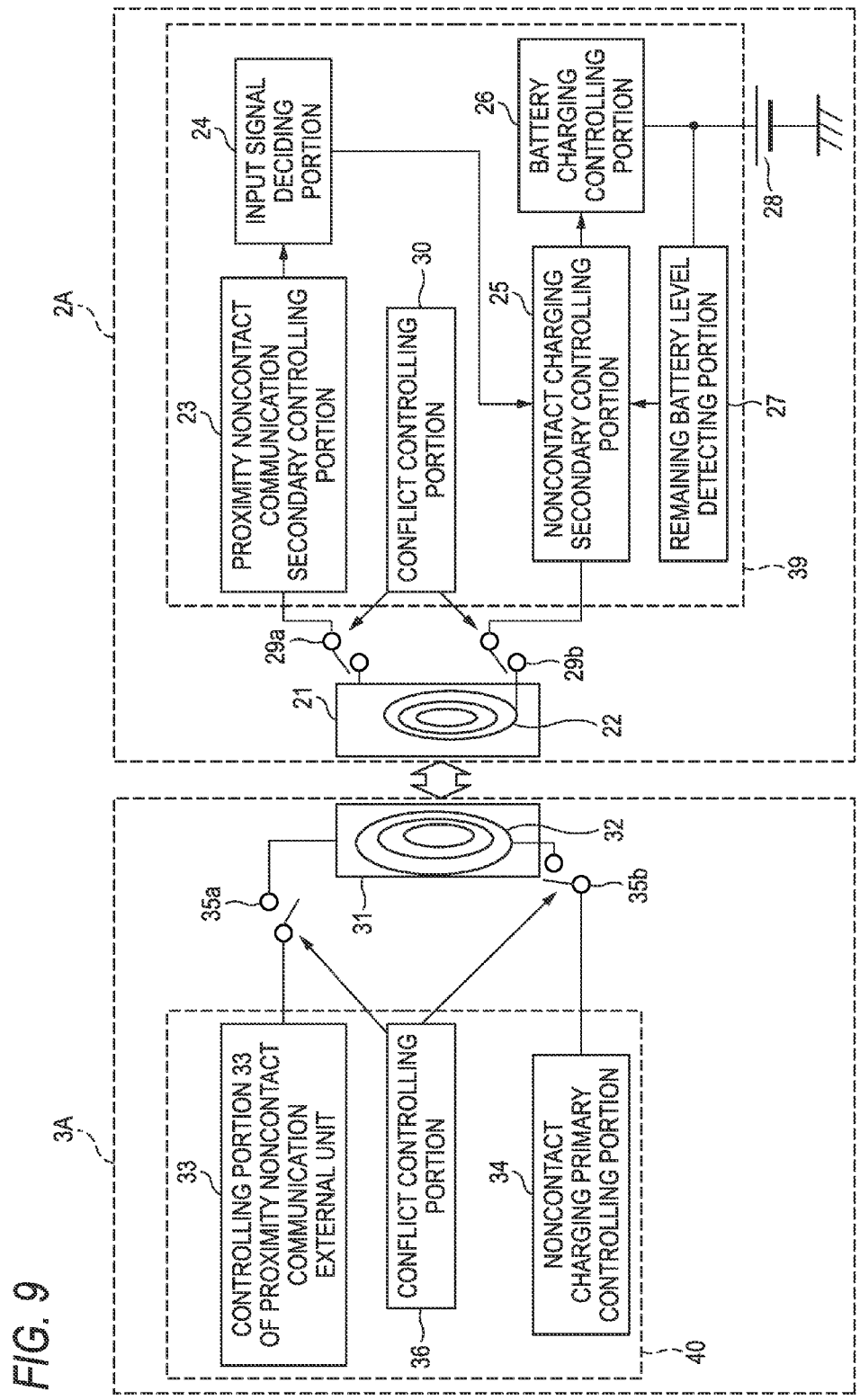
[FIG. 9] A block diagram showing a schematic configuration of an electronic device and a charger of the electronic device charging system in FIG. 8.

FIG. 8 is a perspective view showing an outline of an electronic device charging system according to Embodiment 2 of the present invention. Also, FIG. 9 is a block diagram showing a schematic configuration of an electronic device 2A and a charger 3A of the electronic device charging system 1A according to the present embodiment. As shown in FIG. 8 or FIG. 9, the electronic device charging system 1A according to the present embodiment is constructed such that the proximity noncontact communication antenna and the noncontact charging coil are arranged in the electronic device 2A and the charger 3A in a superposed state respectively. That is, in the electronic device 2A, the proximity noncontact communication antenna 21 and the noncontact power-receiving secondary coil 22 are arranged in a superposed state. More concretely, the proximity noncontact communication antenna 21 is composed of a loop antenna, and the noncontact power-receiving secondary coil 22 is arranged such that its center coincides with a center of the loop antenna. Also, in the charger 3A, the proximity noncontact communication external unit antenna 31 and the noncontact feeding primary coil 32 are arranged in a superposed state. More concretely, like the configuration of the electronic device 2A, the proximity noncontact communication external unit antenna 31 is composed of a loop antenna, and the noncontact feeding primary coil 32 is arranged such that its center coincides with a center of the loop antenna. Because the proximity noncontact communication antenna and the noncontact charging coil are arranged in a superposed state, an occupied area of them in the equipment main bodies respectively can be reduced, and such arrangement can respond to a size reduction of the electronic device 2A and the charger 3A. Further, a center of the proximity noncontact communication antenna 21 is made to coincides with a center of the charger the noncontact power-receiving secondary coil 22, and also a center of the proximity noncontact communication external unit antenna 31 is made to coincides with a center of the noncontact feeding primary coil 32. Therefore, positions of the proximity noncontact communication antenna 21 and the proximity noncontact communication external unit antenna 31 can be set automatically at a time to coincide with positions of the noncontact power-receiving secondary coil 22 and the noncontact feeding primary coil 32.

In addition, in the electronic device 2A, when the proximity noncontact communication antenna 21 is composed of the loop antenna, a part of conductor of the loop antenna and a part of the conductor of the noncontact power-receiving secondary coil 22 may be formed in common. Accordingly, a center of the proximity noncontact communication antenna 21 and a center of the noncontact power-receiving secondary coil 22, both being formed of the common conductor, coincide naturally with each other. Therefore, the volume and the mass of the proximity noncontact communication antenna 21 and the noncontact power-receiving secondary coil 22 can be reduced in total, and a reduction in size and mass of the electronic device 2A can be achieved.

Similarly, in the charger 3A, when the proximity noncontact communication external unit antenna 31 is composed of the loop antenna, a part of conductor of the loop antenna and a part of the conductor of the noncontact feeding primary coil 32 may be formed in common. Accordingly, a center of the proximity noncontact communication external unit antenna 31 and a center of the noncontact feeding primary coil 32, both being formed of the common conductor, coincide naturally with each other. Therefore, the volume and the mass of the proximity noncontact communication external unit antenna 31 and the noncontact feeding primary coil 32 can be reduced in total, and a reduction in size and mass of the charger 3A can be achieved.

Also, when the proximity noncontact communication antenna and the noncontact charging coil are arranged in the electronic device 2A and the charger 3A in a superposed state respectively, an interference is caused between them. Thus, while one component is used, the other component is cut off in operation from the circuit. In order to cut off the unused component from the circuit, the electronic device 2A is equipped with changeover switches 29a, 29b, and a conflict controlling portion 30 for controlling the switching of the changeover switches 29a, 29b. Also, the charger 3A is equipped with changeover switches 35a, 35b, and a conflict controlling portion 36 for controlling the switching of the changeover switches 35a, 35b. For example, when the charger 3A gives a charge of electricity to the electronic device 2A, the conflict controlling portion 36 of the charger 3A turns OFF the changeover switch 35a (open state, cutoff state) and also turns ON the changeover switch 35b (closed state, conduction state), and the conflict controlling portion 30 of the electronic device 2A turns OFF the changeover switch 29a (open state, cutoff state) and also turns ON the changeover switch 29b (closed state, conduction state).

The electric power being fed from the noncontact feeding primary coil 32 to the noncontact power-receiving secondary coil 22 to charge the secondary battery 28 is extremely high in contrast to the electric power being utilized in the proximity noncontact communication between the proximity noncontact communication antenna 21 and the proximity noncontact communication external unit antenna 31. Therefore, the electric power of the harmonic wave produced by the noncontact power-receiving secondary coil 22 is relatively high. As a result, the influence on the proximity noncontact communication cannot be neglected, which may act as the factor that causes a malfunction in the proximity noncontact communicating function.

Therefore, as described above, because the conflict control is applied to the changeover switches 35a, 35b, 29a, 29b, an electric current never flows between the proximity noncontact communication antenna 21 and the proximity noncontact communication secondary controlling portion 23 while the electric power is fed from the noncontact feeding primary coil 32 to the noncontact power-receiving secondary coil 22. As a result, a malfunction never occurs in the proximity noncontact communicating function.

Further, according to this conflict control, an electric current never flows between the noncontact feeding primary coil 32 and the noncontact power-receiving secondary coil 22 during the proximity noncontact communication, and such a situation is never caused that the electric power that is to be utilized in the proximity noncontact communication is absorbed by the noncontact feeding primary coil 32 or the noncontact power-receiving secondary coil 22. As a result, the user can carry out the proximity noncontact communication more firmly.

In this manner, the proximity noncontact communication antenna and the noncontact charging coil are arranged in the electronic device 2A and the charger 3A in a superposed state respectively. Therefore, an occupied area of them in the equipment main bodies respectively can be reduced, and a further size reduction of the electronic device 2A and the charger 3A can be attained. In the present embodiment, it is similar to above Embodiment 1 that the noncontact charging and the proximity noncontact communication are executed between the electronic device 2A and the charger 3A in a time-division system, and also the similar advantages can be achieved.

Here, in the electronic device 2A, the proximity noncontact communication secondary controlling portion 23, the input signal deciding portion 24, the noncontact charging secondary controlling portion 25, the battery charging controlling portion 26, the remaining battery level detecting portion 27, and the conflict controlling portion 30 constitute a charging and communication controlling portion 39 that controls the charging and the proximity noncontact communication. Also, in the charger 3A, the controlling portion 33 of the proximity noncontact communication external unit, the noncontact charging primary controlling portion 34, and the conflict controlling portion 36 constitute a power-transmitting communication controlling portion 40 that controls the power feeding and the proximity noncontact communication.

The present invention is explained in detail with reference to the particular embodiments. But it is apparent for those skilled in the art that various variations and modifications can be applied without departing from a spirit and a scope of the present invention.

This application is based upon Japanese Patent Application (Japanese Patent Application No. 2008-091246) filed on Mar. 31, 2008; wherein the contents of which are incorporated herein by reference.

INDUSTRIAL APPLICABILITY

The present invention possesses such advantages that, even if the charging of the secondary battery is not fully completed, the proximity noncontact communication can be conducted, and that the secondary battery never falls into the overdischarge state during the proximity noncontact communication, and is applicable to the electronic device such as the cellular phone, PHS, PDA, or the like.

The invention claimed is:

1. An electronic device that employs a secondary battery, which is rechargeable by a charger, as a power source and is capable of conducting a proximity noncontact communication with the charger, the electronic device comprising:
   a power receiving coil that receives an electric power from the charger;
   an antenna used for conducting the proximity noncontact communication; and
   wherein the secondary battery is charged with the received electric power; and
   wherein the electronic device executes:
   a first charging process of charging the secondary battery,
   then a first communicating process of conducting the proximity noncontact communication for a first variable communication time,
   then a second charging process of charging the secondary battery, and then a second communicating process of conducting the proximity noncontact communication for a second variable communication time; and
   wherein the first variable communication time is a first predetermined communication period when a voltage of the secondary battery is equal to or greater than a predetermined communication value, and is a second predetermined communication period which is shorter than the first predetermined communication period when the voltage of the secondary battery is smaller than the predetermined communication value, and
   wherein the second variable communication time is a third predetermined communication period when a voltage of the secondary battery is equal to or greater than the predetermined communication value, and is a fourth predetermined communication period which is shorter than the third predetermined communication period when the voltage of the secondary battery is smaller than the predetermined communication value.

2. The electronic device according to claim 1, wherein the electronic device executes the first charging process for a first variable charging time and the second charging process for a second variable charging time; and
   wherein the first variable charging time is a first predetermined charging period when the voltage of the secondary battery is equal to or greater than a predetermined charging value, and is a second predetermined charging period which is shorter than the first predetermined charging period when the voltage of the secondary battery is smaller than the predetermined charging value, and
   wherein the second variable charging time is a third predetermined charging period when a voltage of the secondary battery is equal to or greater than the predetermined charging value, and is a fourth predetermined charging period which is shorter than the third predetermined charging period when the voltage of the secondary battery is smaller than the predetermined charging value.

3. The electronic device according to claim 1, wherein the antenna and the power receiving coil are arranged in a superposed state.

4. The electronic device according to claim 1, wherein the antenna is composed of a loop antenna, and a center of the loop antenna is set to coincide with a center of the power receiving coil.

5. The electronic device according to claim 4, wherein a part of a conductor of the loop antenna and a part of a conductor of the power receiving coil are formed in common.

6. The electronic device according to claim 1, further comprising:
   a charging and communication controlling section that controls the charging and the proximity noncontact communication;
   a changeover switch connected to the antenna, and that switches electrical conduction and cutoff to the antenna,
   wherein the charging and communication controlling section brings the changeover switch into a conduction state during the first communicating process and the second communicating process, and brings the changeover switch into a cutoff state during the first charging process and the second charging process.

7. A charger for being capable of charging the electronic device set forth in claim 1, and for being capable of conducting a proximity noncontact communication with the electronic device, wherein the electronic device employing a secondary battery as a power source, the charger comprising:

a power transmitting coil that transmits an electric power to the electronic device by electromagnetic induction;

an antenna used for conducting the proximity noncontact communication; and a charging and communication controlling section that controls a power transmission and the proximity noncontact communication.

8. The charger according to claim 7, wherein the antenna and the power transmitting coil are arranged in a superposed state.

9. The charger according to claim 7, wherein the antenna is composed of a loop antenna, and a center of the loop antenna is set to coincide with a center of the power receiving coil.

10. The charger according to claim 9, wherein a part of a conductor of the loop antenna and a part of a conductor of the power transmitting coil are formed in common.

11. The charger according to claim 7, further comprising:
a changeover switch connected to the antenna, and that switches electrical conduction and cutoff to the antenna,
wherein the charging and communication controlling section brings the changeover switch into a conduction state during the first communicating process and the second communicating process, and brings the changeover switch into a cutoff state during the first charging process and the second charging process.

12. An electronic device charging system, comprising:
the electronic device set forth in claim 1; and
a charger for being capable of charging the electronic device, and for being capable of conducting a proximity noncontact communication with the electronic device, wherein the electronic device employing a secondary battery as a power source, the charger comprising:
a power transmitting coil that transmits an electric power to the electronic device by electromagnetic induction;
an antenna used for conducting the proximity noncontact communication; and
a charging and communication controlling section that controls a power transmission and the proximity noncontact communication.

13. The electronic device according to claim 1, wherein the first charging process is terminated before the first communication process is initiated.

14. The electronic device according to claim 1, wherein the second charging process is terminated before the second communication process is initiated.

15. The electronic device according to claim 1, wherein the proximity noncontact communication involves video data.

16. The electronic device of claim 1, wherein the first predetermined communication period and the third predetermined communication period are equal in length.

17. The electronic device of claim 1, wherein the second predetermined communication period and the fourth predetermined communication period are equal in length.

18. The electronic device of claim 2, wherein the first predetermined charging period and the third predetermined charging period are equal in length.

19. The electronic device of claim 2, wherein the second predetermined charging period and the fourth predetermined charging period are equal in length.

20. A process for controlling charging of a secondary battery by a charger, the secondary battery capable of serving as a power source for an electronic device, and proximity noncontact communication between the electronic device and the charger, the process comprising:

a first charging process for charging the secondary battery, the first charging process including providing electric power to a power receiving coil;

a first communicating process of conducting the proximity noncontact communication for a first variable communication time;

a second charging process for charging the secondary battery, the second charging process including providing electric power to the power receiving coil;

a second communicating process of conducting the proximity noncontact communication for a second variable time; and wherein the first variable communication time is a first predetermined communication period when a voltage of the secondary battery is equal to or greater than a predetermined communication value, and is a second predetermined communication period which is shorter than the first predetermined communication period when the voltage of the secondary battery is smaller than the predetermined communication value, and wherein the second variable communication time is a third predetermined communication period when a voltage of the secondary battery is equal to or greater than the predetermined communication value, and is a fourth predetermined communication period which is shorter than the third predetermined communication period when the voltage of the secondary battery is smaller than the predetermined communication value.

21. The process of claim 20 further comprising conducting the first charging process for a first variable charging time and conducting the second charging process for a second variable charging time, the first variable charging time is a first predetermined charging period when the voltage of the secondary battery is equal to or greater than a predetermined charging value, and is a second predetermined charging period which is shorter than the first predetermined charging period when the voltage of the secondary battery is smaller than the predetermined charging value, and wherein the second variable charging time is a third predetermined charging period when a voltage of the secondary battery is equal to or greater than the predetermined charging value, and is a fourth predetermined charging period which is shorter than the third predetermined charging period when the voltage of the secondary battery is smaller than the predetermined charging value.

22. The process of claim 20, wherein the first predetermined communication period and the third predetermined communication period are equal in length.

23. The process of claim 20, wherein the second predetermined communication period and the fourth predetermined communication period are equal in length.

24. The process of claim 21, wherein the first predetermined charging period and the third predetermined charging period are equal in length.

25. The process of claim 21, wherein the second predetermined charging period and the fourth predetermined charging period are equal in length.

26. The electronic device of claim 2, wherein the predetermined communication value is equal to the predetermined charging value.

27. The process of claim 21, wherein the predetermined communication value is equal to the predetermined charging value.

* * * * *